Patented June 9, 1936

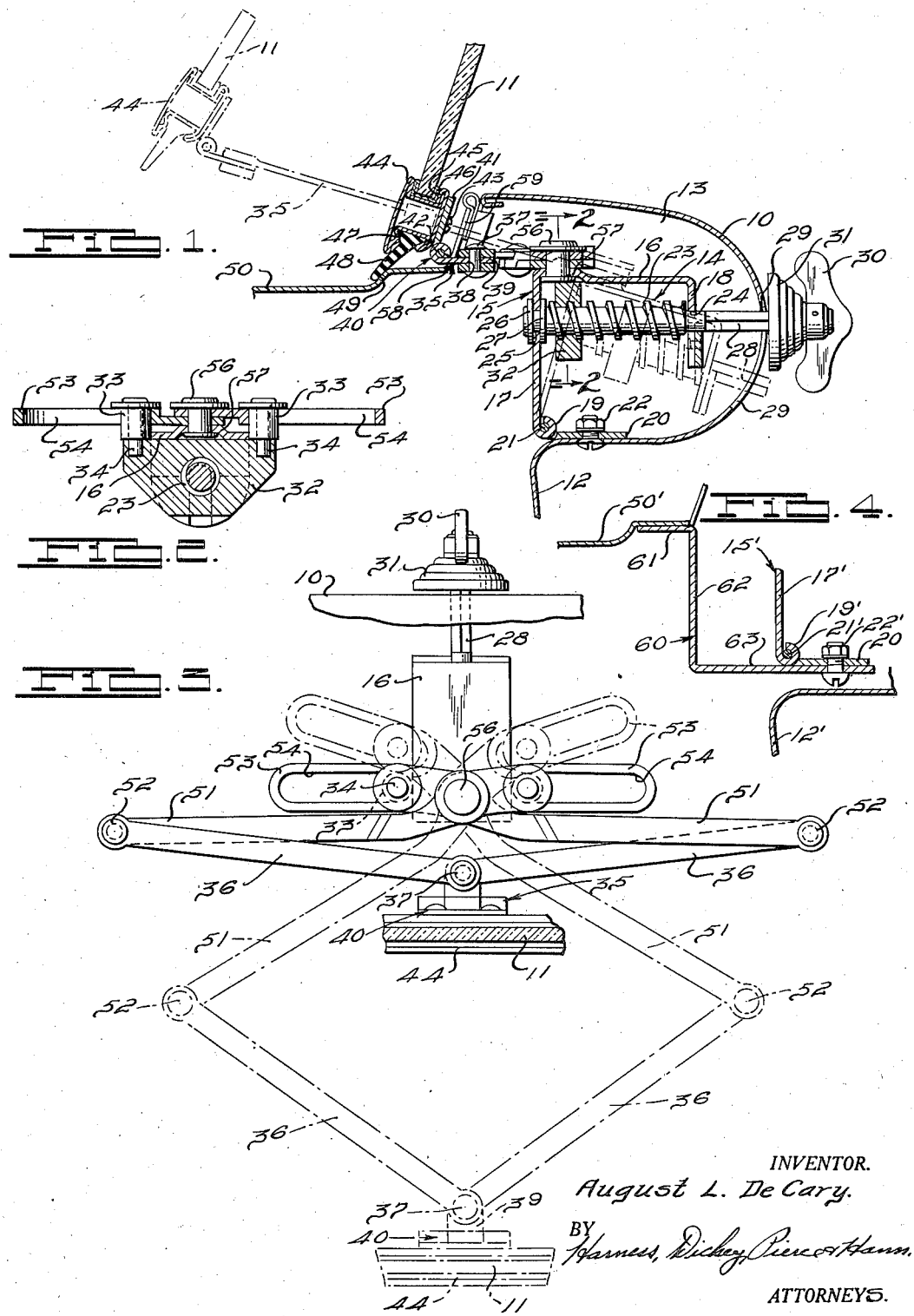

2,043,349

UNITED STATES PATENT OFFICE 2,043,349

WINDSHIELD OPERATING MECHANISM

August L. De Cary, Detroit, Mich.

Application January 21, 1935, Serial No. 2,680

14 Claims. (Cl. 296—84)

This invention relates to improved apparatus for regulating adjustable structures.

More specifically the invention pertains to improvements in regulating apparatus which is particularly adapted for operating adjustable vehicle windshields.

One of the main objects of the invention is to provide an articulated mounting for regulating apparatus of this character which accommodates bodily movement thereof during adjustment of the structure with which it is associated so as to compensate for changes in the angularity between the structure operated upon and the apparatus and to maintain an advantageous angularity therebetween throughout the entire range of adjustment of the structure.

Another object of the invention is to provide improved regulating apparatus of this kind which rigidly holds the structure with which it is associated, as for example a vehicle windshield, against unintended displacement in either direction from any one of a large variety of selected positions.

A further object of the invention is to provide regulating apparatus for vehicle windshields and similar structure which has a manual control member that produces a greater amount of change in the position of the structure per unit of movement of the control, throughout a predetermined portion of the range of movement of said structure than throughout the remaining portion of said range.

Another object of the invention is to provide mechanism of the kind from which its maximum mechanical advantage resisting unintended closing of the windshield is devised while the windshield is in its substantially fully open position.

A still further object of the invention is to provide windshield regulating apparatus which is so constructed and arranged as to open the windshield further per unit of movement of its control member during initial opening movements from a substantially closed position than during further opening movement of the windshield towards its full open position.

Other objects of the invention are to provide operating means of a toggle nature in regulating apparatus of this character which requires the formation of only a relatively small passage in the frame structure surrounding the windshield to accommodate its operating movements; to provide a substantially self contained actuating unit which is removable from within and insertable into said frame structure in a substantially completely assembled relation; to provide rolling contact elements in an actuating unit of this character which serve the dual purpose of substantially frictionlessly applying the actuating force of the unit to the toggle means and of frictionlessly guiding relative movement of one of the parts of the actuating unit with respect to an associated part thereof; to provide an actuating unit for regulating apparatus of this kind which is, in effect, self locking to maintain the regulated structure in an open position or at any partially open position; and to provide an actuating unit of this kind which is conveniently operable by a rotative control member and which requires but a few turns of said member to move the windshield from a fully open to a fully closed position, as well as from a fully closed to a fully open position.

The above being among the objects of the present invention, the same consists in certain novel features of construction and combinations of parts to be hereinafter described with reference to the accompanying drawing and then claimed, having the above and other objects in view.

Illustrative embodiments of the invention are shown in the accompanying drawing, in which:

Fig. 1 is a fragmentary vertical sectional view of the improved regulating apparatus showing an installation of the latter in a vehicle for regulating the windshield thereof.

Fig. 2 is a transverse sectional view taken on the line 2—2 of Fig. 1.

Fig. 3 is a fragmentary plan view of the regulating apparatus illustrated in Fig. 1, showing the positions of the parts thereof corresponding to the closed and open positions of the windshield respectively.

Fig. 4 is a fragmentary vertical sectional view showing a mounting for the regulating apparatus similar to that included in Fig. 1, but embodying a modified form of the invention.

In Figs. 1 to 3, inclusive, is illustrated an installation of the improved regulating apparatus in the stationary windshield frame structure 10 of a vehicle having a windshield 11 pivotally mounted along its upper edge for oscillation with respect to a substantially horizontal axis (not shown) extending transversely of the vehicle. The regulating apparatus is particularly adapted for controlling vehicle windshields but it may be used to advantage in conjunction with numerous adjustable structures, such for example as ventilators, dampers, flues, and the like.

The windshield frame portion 10, which extends transversely of the vehicle, comprises sheet metal and it may be formed to any desired contour to conform with the interior trim of the vehicle body and the sheet metal thereof may be continued downwardly to provide an instrument board, as illustrated at 12 in Fig. 1. Formed in the central portion of the frame member 10 is a recess 13 in which is confined the windshield regulator actuating unit, generally designated by the numeral 14.

The actuating unit, shown in Figs. 1 to 3, inclusive, is mounted on a support 15 comprising an inverted channel-shaped metal strap having an intermediate web 16, a comparatively wide front flange 17, and a relatively narrower rear flange 18. Hinge elements 19 are provided on the lower edge of the front flange 17 by which the support is pivotally attached to a mounting bracket 20 carrying a pintle 21 and detachably secured to the frame portion 10 by a bolt 22.

The actuating unit includes a worm 23 which is journaled in aligned apertures 24 and 25 in the spaced flanges 17 and 18 of the support 16 and which is held against axial displacement relative to the support by washers 26 and 27 mounted on each side of the flange 17 respectively. The worm 23 has a rearwardly extending axial stem portion 28 of square cross section which projects through an enlarged slot 29 in the wall of the windshield frame portion 10. Fixed on one end portion of the stem 28 is a handle 30 and an adjacent forwardly located shield 31 which substantially conceals the slot 29.

A worm-nut 32 is threaded on the worm 23 and adapted to move axially of the worm between the flanges 17 and 18 of the support 15. This worm-nut is held against rotation relative to the support by spaced rollers 33, each journaled on a pin 34 mounted on the worm-nut 32 and having rolling contact engagement with the opposite edge portions of the web 16 of the support. The rollers 33 extend beyond the upper side of the web 16 and coact with an operating member, generally designated by the numeral 35, which interconnects the actuating unit 14 and the windshield 11 and imparts to the latter the actuating force of the unit.

The operating member 35 includes a toggle comprising outer forwardly converging toggle arms 36 which are pivotally connected together at their outer extremities by a rivet 37. This rivet extends through an aperture 38 in one hinge plate 39 of a hinge, generally designated by the numeral 40 in Fig. 1. The hinge 40 has a hinge plate 41 pivotally attached to the hinge plate 39 by a pintle 42 and detachably secured by screws 43 to a fixture 44 which embraces the lower edge portion of the windshield.

The fixture 44 may comprise a metal garnish moulding extending the full length of the lower edge of the windshield glass and having a suitable channel 45 in its upper edge portion for receiving the edge portions of the glass, a yieldable lining 46 preferably comprising rubber, being provided in the channel 45 for protecting the glass and forming a water tight seal between the latter and the sides of the channel. The lining 46 also serves to assist in firmly holding the garnish moulding in clamping relation upon the edge of the glass. The lower edge portion of the garnish moulding 44 is provided with a channel 47 between the sides of which is clamped a wedge-shaped sealing strip 48, also preferably comprising rubber. This sealing strip extends substantially the full length of the windshield and contacts with a shoulder 49 formed in the cowl panel 50 adjacent the windshield when the latter is closed and is provided for the purpose of preventing the admission of water to the interior of the vehicle body.

The rearward extremities of the toggle arms 36 are pivotally attached by rivets 52 to the forward extremities of a pair of toggle arms 51 which have correspondingly offset rear end portions 53, each provided with an elongated slot 54 in which is received one of the rollers 33 respectively. The offset portions 53 of the rear toggle arms 51 extend into the recess 13 of the frame member 10 and they are pivotally connected together by a rivet 56 which is mounted on and extends through an aperture in a raised portion 57 of the web 16 of the support 15. The parts of the rear toggle levers 51 adjacent their pivotal attachment to the support 15 extend outwardly from the recess 13 and from the interior of the vehicle body compartment through a slot 58 provided in an upwardly extending flange 59 which may be formed integral with the cowl panel 50 and fixed to the forward extremity of the frame member 10.

In operation, during clockwise rotation of the operating handle 30, as viewed from the right in Fig. 1, the worm 23 is turned in a corresponding direction and the worm-nut 32 is moved rearwardly or to the right as illustrated in dotted lines in Fig. 1. The movement of the worm-nut is confined to a substantially straight linear course by the engagement of the peripheries of the rollers 33 with the edge portions of the web 16 of the support 15. This movement of the worm-nut and rollers mounted thereon causes the rear end portions 53 of the toggle members 51 to turn toward each other about the axis of the pivot 56 and the forward end portions of the toggle levers are likewise rotated toward each other in such a manner as to expand the toggle operating member 35 and project the forward toggle elements thereof outwardly, thereby swinging the windshield about its pivotal axis to the dotted line open position illustrated in Fig. 1. During this operation of the regulating apparatus, the support 15 is pivoted about the axis of the pintle 21 to accommodate such movement of the actuating apparatus as is required to maintain the toggle member 35 and the path of movement of the worm-nut 23 in substantially parallel relationship as well as to maintain that angular relationship between the windshield 11 and the toggle member which facilitates advantageous application of the force of the actuating unit 14 upon the windshield. By varying the angular relation of the actuating unit and operating member 35 to correspond with the portion of the windshield in this manner, the provision of only a relatively narrow slot 58 is required to accommodate the action of those portions of the toggle members which extend through the slot, in the various positions of the windshield.

The worm and worm-nut 23 and 32 respectively preferably have threads of irreversible pitch and therefore the actuating unit is self-acting in retaining the windshield in a partially open position. The pitch of these threads is preferably large enough to enable movement of the windshield throughout its entire range during only a relatively few turns of the worm, as for example, six turns thereof. Unintended closing of the windshield from an open or a partially open position is substantially positively opposed by the threads of the worm and worm-nut and by the toggle arms 36 and 51 which cannot change their relative angular positions so long as the rear ends of the toggle arms 51 are held by the rollers 33 and worm-nut from pivotal movement toward each other.

The reverse operation of the parts of the apparatus occurs when the worm 23 is turned in a counter-clockwise direction, as viewed from the right in Fig. 1, during closing movement of the windshield. When the windshield is fully closed the self-locking action of the operating unit prevents unintended openings of the windshield and retains the sealing strip 48 in firm sealing engagement with its cooperating shoulder 49 of the cowl panel 50.

The arcuate movement of the rear toggle arms 51 per unit of linear movement of the rollers 33 from the positions of the latter corresponding to the closed position of the windshield, is greater during initial openings movements of the windshield from a closed position than during subsequent opening movements thereof. As a result of this condition, the windshield is opened a greater amount per turn of the worm 23 during the initial stages of its opening movement than during subsequent opening movements thereof and the amount of opening per turn of the worm decreases as the amount of opening of the windshield increases. Likewise, the amount the windshield is closed per turn of the worm 23 varies from a minimum at substantially full open position of the windshield to a maximum at the substantially fully closed position of the latter. The maximum mechanical advantage of the regulating apparatus is therefore available to resist unintended closing of the windshield from a wide open position by wind pressure and rapid initial opening of the windshield is provided for.

The actuating unit 14 may be conveniently removed for repair or replacement by removing the handle and shield 30 and 31 respectively, and the bolt 22, and delocking the toggle member.

In Fig. 4 is illustrated a mounting for the improved regulating apparatus embodying a further development of the invention. In this form, the forward, relatively long flange 17' of the support, generally designated by the numeral 15' is provided with hinge elements 19' by which it is pivotally attached to a pintle 21' carried by a plate 20'. The plate 20' is detachably secured by a bolt 22' to an angle bracket 60 having a horizontal upper flange 61 welded or otherwise suitably secured to a portion of the cowl panel 50'. The bracket 60 includes a vertically downwardly extending intermediate part 62 and a substantially horizontal lower flange 63 for supporting the support 15' and an actuating unit of the character shown in Figs. 1 to 3, inclusive.

While I have described and illustrated several embodiments of my invention, it will be apparent to those skilled in the art that various changes, omissions, additions and substitutions may be made therein without departing from the spirit and scope of my invention, as set forth in the accompanying claims.

I claim:

1. In a structure including a stationary portion and a relatively movable portion, apparatus for adjustably regulating said movable portion including actuating mechanism, a toggle member interconnecting said actuating mechanism and said movable portion, including a pair of crossed toggle arms and a toggle link pivotally connecting an end of each arm to said movable portion respectively, and an articulated mounting bodily movably supporting said mechanism and said toggle members on said stationary structure, said mounting being so constructed and arranged as to move said mechanism and said toggle member in unison for maintaining substantially the same angular relation between said mechanism and said toggle member and between the latter and said movable portion throughout the entire range of movement of the latter.

2. In a structure including a stationary portion and a relatively movable portion, apparatus for adjustably regulating said movable portion including actuating mechanism, a toggle member interconnecting said actuating mechanism and said movable portion comprising a plurality of pivotally connected links each having a portion directly pivotally connected to a portion of an adjacent link and disposed in substantially parallel planes and having pivotal axes substantially normal to said planes, and means for movably supporting said mechanism and accommodating movement thereof relative to said stationary portion, said means being so constructed and arranged as to accommodate operation of said links while the latter are in parallel planes and to maintain said planes in substantially the same angular relation to said movable member throughout the entire range of movement of the latter.

3. In a vehicle having an adjustable windshield and an associated stationary frame portion having a passage therethrough of comparatively limited dimensions, windshield regulating apparatus including a support, a toggle member having a pivot fixed on said support and having a pair of arms directly pivotally connected together and to said supports by said pivots, said toggle member being pivotally attached to said windshield and being extensible and retractable through said passage, atcuating mechanism mounted on said support and operatively associated with said toggle member, and a mounting articulating said support with said frame portion for accommodating unitary bodily movement of the said mechanism and toggle member to maintain the latter out of contact with the sides of said passage throughout the range of movement of said windshield.

4. In a vehicle having an adjustable pivotally mounted windshield and having an associated frame portion provided with a passage therethrough, windshield regulating apparatus including a support, a toggle member having a pivot fixed to said support, said member being pivotally attached to said windshield and extensible and retractable through said passage, actuating mechanism carried by said support and operatively connected with said toggle member, and a mounting for said support pivotally secured to said frame portion having an axis substantially parallel to the axis of said windshield and adapted to accommodate movement of said support corresponding to the movement of said windshield for maintaining said toggle member in accurate alignment with said passage throughout substantially the entire range of movement of said windshield.

5. Regulating apparatus including a support, actuating mechanism including a member shiftable relative to said support, rolling contact elements on said shiftable member coacting with said support for guiding the movement of said shiftable member, and an operating member having edge portions in contact with peripheral portions of said elements for deriving therefrom the actuating force of said mechanism.

6. Regulating apparatus including a support, actuating mechanism including a member shiftable relative to said support, an operating member including a toggle comprising toggle elements having end portions disposed in related proximity to opposite edges of said support, and rolling contact elements on said shiftable member coacting with said opposite edges of said support for guiding the movement of said shiftable member and coacting with said end portions of said toggle elements for imparting thereto the actuating force of said mechanism.

7. Regulating apparatus including a support, actuating mechanism including a member shiftable relative to said support, an operating member including a toggle comprising toggle elements having end portions disposed in related proximity to opposite edges of said support, and each provided with an elongated slot, and a pair of rolling contact elements in said shiftable member, one engaged with each of said opposite edges of said support for guiding the movement of said shiftable member, one of said rolling contact elements being disposed in and having rolling contact engagement with a side of each of said elongated slots respectively for imparting to said toggle the actuating force of said mechanism.

8. Regulating apparatus including a support, actuating mechanism including a worm rotatably mounted on said support, a worm-nut on said worm, rolling contact elements on said worm-nut in rolling contact engagement with said support for guiding the movement of said worm nut, and an operating member adapted to be connected with a structure to be regulated and having surface portions operatively contacting with one of said elements for deriving therefrom the actuating force of said mechanism.

9. Regulating apparatus including a support, actuating mechanism mounted on said support including a rotatable worm and a shiftable worm nut having irreversible pitch threads, a toggle member pivotally mounted on said support adapted to be connected with a structure to be regulated, means operatively connecting said worm nut and said toggle member for actuating the latter, apparatus for combining the actuating movement of said means to a course traversing the path of pivotal movement of the portions of said toggle member with which they coact and being so constructed and arranged as to cause said toggle member to extend further per unit of rotation of said worm during initial extension of said toggle member from a fully retracted position than during subsequent extension thereof.

10. Regulating apparatus including a support, a toggle member operatively mounted on said support and adapted for connection with a structure to be regulated, said member including toggle elements, having elongated slots in their adjacent end portions, and actuating mechanism having elements slidably engaged in said slots and confined to a course of substantially linear movement relative thereto for extending said toggle member diverse distances per unit of operation of said mechanism during extension of said toggle member through different portions of its range of action respectively.

11. Regulating apparatus for a vehicle windshield including a support, means articulating said support to the stationary structure associated with said windshield for accommodating movement of said support corresponding to the movement of said windshield, a worm and worm-nut operatively mounted on said support, means for confining the movement of said worm-nut to a substantially linear course including a rolling contact element, and a toggle member pivotally mounted on said support and pivotally attached to said windshield, the end of said toggle member adjacent said support being operable by and in rolling contact engagement with said rolling contact element and being so constructed and arranged as to open said windshield further per rotation of said worm during opening movement of said windshield from a fully closed position than during subsequent opening movement thereof.

12. Regulating apparatus including a support, a toggle member operatively mounted on said support adapted for connection with a structure to be regulated and including toggle arms having driven end portions, means for confining the movement of said driven end portions to a predetermined course, actuating mechanism on said support having driving elements operatively connected with the driven end portions of said toggle member for extending and retracting the latter, and means for confining the movement of said elements to a predetermined course traversing the course of said driven end portion and being so constructed and arranged as to cause said toggle member to extend further per unit of operation of said mechanism during extension of said toggle member from a fully retracted position than during subsequent extension thereof.

13. Regulating apparatus including a support, a driven member pivotally mounted thereon and adapted for engagement with a structure to be regulated, and actuating mechanism including a driving element slidably engaged with a portion of said driven member and confined to a course of movement traversing the course of pivotal movement of the latter for driving said driven member diverse distances per unit of operation of said mechanism during movement of said driven member through different portions of its range of action respectively.

14. Regulating apparatus including a support, a toggle member operatively mounted on said support and adapted for connection with a structure to be regulated, said member including toggle elements, and actuating mechanism having elements slidably engaged with said toggle elements and confined to a course of movement traversing the course of movement of said toggle elements for extending said toggle member diverse distances per unit of operation of said mechanism during extension of said toggle member through different portions of its range of action respectively.

AUGUST L. DE CARY.